Nov. 17, 1970    J. E. ROCHTE ET AL    3,540,858
SAMPLE HOLDER WITH FILTER MEANS
Filed Jan. 22, 1968                     5 Sheets-Sheet 1

INVENTORS
HUGH O. BROWN
DAVID J. MALK
JERRY E. ROCHTE
BY
ATTORNEY

United States Patent Office 3,540,858
Patented Nov. 17, 1970

3,540,858
SAMPLE HOLDER WITH FILTER MEANS
Jerry E. Rochte, Seal Beach, Hugh O. Brown, Fullerton, and David J. Malk, La Habra, Calif., assignors to Beckman Instruments, Inc., a corporation of California
Filed Jan. 22, 1968, Ser. No. 699,682
Int. Cl. B01d 23/02
U.S. Cl. 23—292                                    9 Claims

ABSTRACT OF THE DISCLOSURE

Disposable sample holding means for use in an automated chemical analyzer, having a plurality of cups formed in a flexible, liquid-impermeable material, such as plastic or plasticized paper, and incorporated filter means, such as a sheet of porous material or paper, associated with the cups. The sample holders may be in the form of a tape or a turntable disc, or a separate capsule processing a sample from a single source discarded after use.

---

The present invention relates to automated wet chemical or clinical analyzers and, more particularly, to biological sample holders or capsules of a disposable type for use in such analyzers, which holders take the place of a plurality of test tubes and possess novel features providing for filtering the sample in situ and correlation of the final solution with the raw sample.

Present day development of automated means for clinically processing and analyzing samples of biological fluids has led to the development of apparatus of the type which employs conveying means to carry an array of test tubes or other form of containers to processing stations where various operational steps are performed. Typical functions of the containers are to carry the bulk raw sample which is in a liquid state, to carry a measured portion of the bulk sample to which a reagent or reagents are added, to carry a filtered sample through an incubator, and to carry the incubated sample through a colorimetry station. In such systems, new or clean, that is, contamination-free, containers must be supplied to the conveying means and used or "dirty" containers must be removed for washing and cleaning for later-reuse, with the attendant disadvantages of possible cross-contamination and breakage as well as the need for cleaning facilities.

It is, therefore, an object of the present invention to provide disposable sample holding means which are delivered in uncontaminated condition and are used in a manner which inhibits cross-contamination between samples.

Another object is the provision of means for filtering a reacted sample in situ.

A further object is the provision of a sample holder or capsule with means for maintaining positive identification of samples from the time that they are taken from a patient until they have been analyzed and the results recorded.

A still further object is to provide a unitary sample holding means or capsule simple in construction, easily produced in quantity and economical so as to be discarded after use.

In one embodiment, the sample holding means of the present invention may take the form of a tape or turntable disc constructed of a suitable liquid-impermeable material having a plurality of wells or cups formed therein and a thin protective membrane over the cups which is pierced by a needle or probe, or is provided with suitable openings, to place the sample or other material in the cups or extract the same therefrom. In another form, the sample holder or capsule is a separate unit used to process a sample from a single source or only one patient so as to be individual to him. Additionally, the several forms of sample holders may be fabricated with filter means between certain cups, and each form may be provided with identifying indicia.

Other objects, advantages and features of the present invention will become better understood by reference to the following detailed description when considered in connection with the accompanying drawing wherein.

Figure 1:
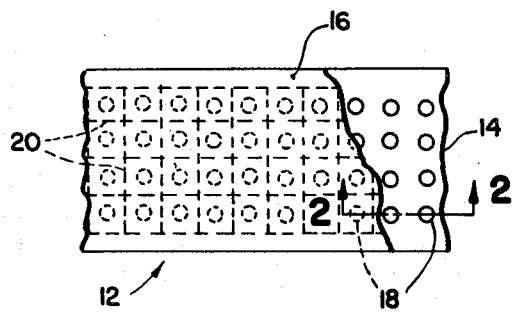
FIG. 1 is a fragmentary plan view of one embodiment of the present invention in the form of a tape.
Figure 2:
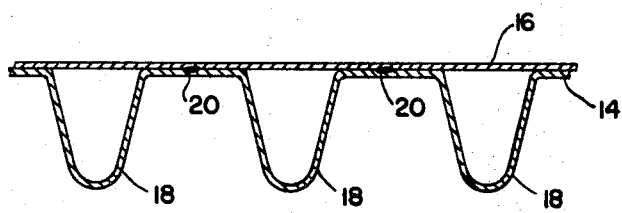
FIG. 2 is a fragmentary sectional view of the tape, on a larger scale, taken generally along line 2—2 of FIG. 1.

Referring now to the drawing, there is shown in FIG. 1 sample holding means according to the present invention which is in the form of a tape 12 made up of a body member 14 and a protective cover 16, both of a flexible, liquid-impermeable material. For example, member 14 may be made of a vacuum-formed plastic or plasticized paper, or the like, and cover 16 of a polyethylene film, or the like. Directing attention also to FIG. 2 it will be noted that body member 14 is formed with a plurality of rows of compartments, wells or cups 18, cover 16 being disposed thereover and suitably sealed to member 14, as at 20.

Figure 3:
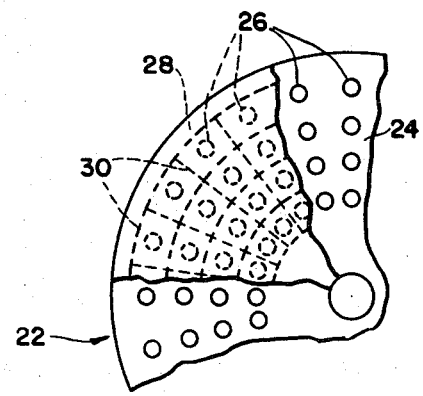
FIG. 3 is a fragmentary plan view of another embodiment of the present invention in the form of a plate-like disc.

Alternatively, in place of tape 12, a turntable 22, FIG. 3, may be employed, the turntable including a plate-like disc 24 in which radially disposed rows of cups 26, similar to cups 18 of tape 12, are formed and covered by protective cover 28, similar to cover 18, suitably sealed to plate 24, as at 30.

Figure 4:
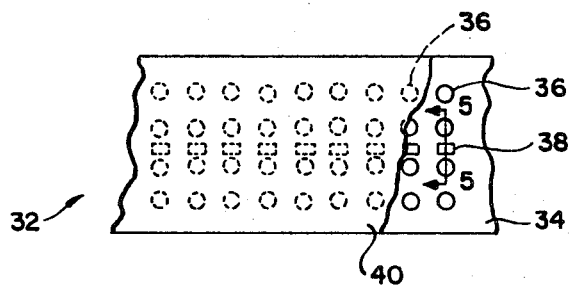
FIG. 4 is a fragmentary plan view of a modification of the tape of FIG. 1 which incorporates filter means.
Figure 5:
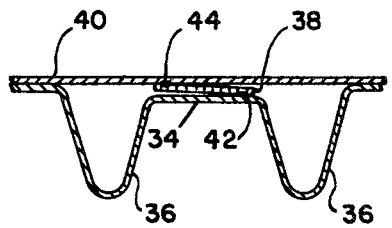
FIG. 5 is a fragmentary detail sectional view, on a larger scale, taken generally along line 5—5 of FIG. 4.

Turning now to FIG. 4 there is shown a modification of the tape form of sample holding means which is a tape generally designated by a reference numeral 32. Tape 32 includes a body member 34 formed with wells or cups 36 similar to cups 18 but some of the cups 36 have associated therewith a filter means 38, all protected with a cover 40. Better seen in FIG. 5, the filter 38 is made of a suitable porous material, for example, a sheet of porous filter paper, the leading edge of which is glued, cemented, bonded or otherwise suitably sealed to the body member 34, as at 42, and the trailing edge is similarly sealed to the cover, as at 44, the side edges of the filter sheet being sealed to the body member. Alternatively, the leading edge could be sealed to the cover and the trailing edge to the body member.

Figure 6:
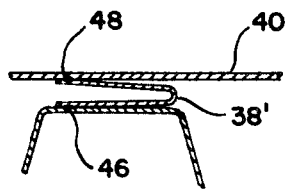
FIG. 6 is a fragmentary detail view showing an alternate form of the filter means.

FIG. 6 illustrates an alternate form of filter 38' in which the sheet of porous material is doubled back upon itself to provide a U-shaped envelope with the side edges thereof sealed to each other and the other edges sealed to the body member and cover, as at 46 and 48, respectively.

Figure 7:
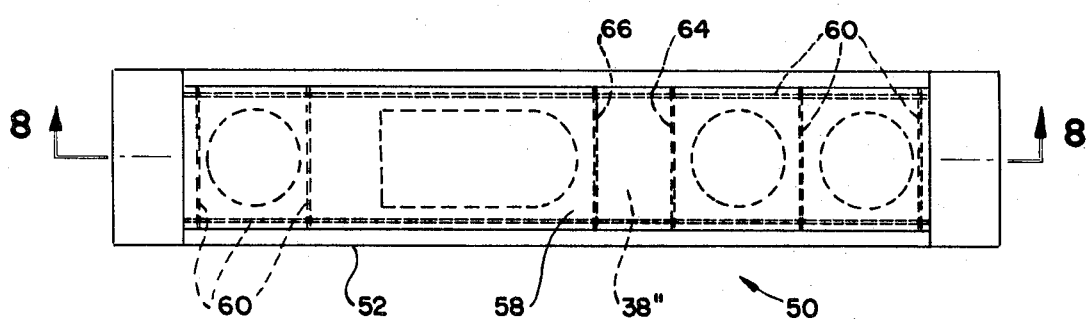
FIG. 7 is a plan view of a unitary form of sample holder of the present invention.
Figure 8:
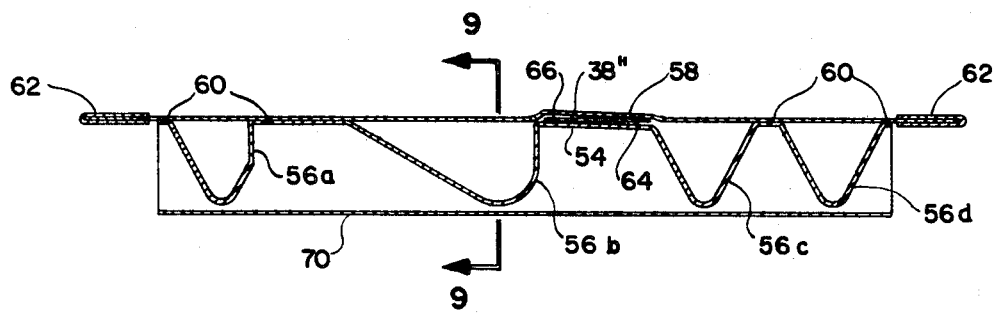
FIG. 8 is a side elevation, in section, of the unitary sample holder, taken generally along line 8—8 of FIG. 7.
Figure 9:
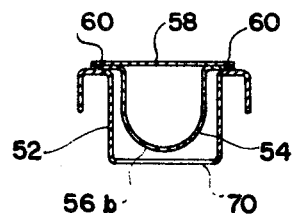
FIG. 9 is an end elevation, in section, of the unitary sample holder, taken generally along line 9—9 of FIG. 8.

FIGS. 7-9 are views of a unitary form of sample holder or capsule designated generally by reference numeral 50 and including a generally U-shaped support or carrier 52. Supported within carrier 52 is an elongated body member 54 formed with a plurality of wells or cups 56a-d, with a cover 58 thereover, the body member and cover being sealed to each other and the carrier, as at 60. To stiffen the ends of capsule 50 and provide magnetically attractable runners which are adapted to slide along a pair of elongated magnetic supports (not shown) during travel of the capsule, the ends of the body member and cover are received between the sides of U-shaped, plate-like clips 62, of suitable material.

Intermediate cups 56b and 56c is a filter 38″ which is like filter 38 and is sealed to the body member and cover, as at 64 and 66, respectively, the side edges of filter 38″ being sealed to the sides of the body member by seals 60. Alternatively, filter 38″ could take the form of filter 38″ of FIG. 6.

If desired, the covers of the tapes 12 and 32, the turntable disc 24 and the capsule 50 may be provided with suitable openings for receipt and transfer of materials therethrough instead of by means of needles or probes.

The sample holder or capsule 50 of FIGS. 7-9 may be used for performing a variety of clinical analyses and its use will be described in connection with the analysis of glucose in blood serum. Glucose is a common analysis which is run in hospital laboratories and is fairly typical of the analytical procedures required. In practice, the capsule 50 is supported on a pair of rails, or the like, and advanced therealong, blood serum is placed in cup 56a at the first station and at the next a measured amount thereof, possibly diluted by water, is transferred to cup 56b. Then, at station three, a precipitating reagent, such as tungstic acid, is added to cup 56b and the mixture is agitated or mixed to precipitate the serum protein. At the next station, pressure is applied to cup 56b, as by an expanding bladder or a pair of external rams, for which latter purpose the carrier 52 is provided with an opening 70 of sufficient size to accommodate one of the rams. Application of pressure to cup 56b is made in a manner to cause the fluid to flow out of the cup toward cup 56c. The serum protein precipitate is trapped by the filter 38″, with only the protein-free filtrate passing to cup 56c. At the next station, a portion of the filtrate is removed from cup 56c and placed in cup 56d along with a copper reagent. The sample is now in condition to enter an incubator where it is held at somewhere around 95° to 100° C. for a period of about 10 minutes for the necessary reaction to take place. Afterward, it is permitted to cool and then moved on to the next station where a phosphomolybdate reagent is added to develop color in the reacted solution. Following a mixing period, the solution is pumped out of cup 56d and through the cell of a colorimeter where the optical density of the solution is determined. This optical density then is a measure of the amount of glucose which was in the original blood sample. The used capsule is then discarded.

It is understood, of course, that each row of cups of the tapes 12 and 32 and turntable 22 may be advanced to stations for processing of the materials in the cups thereof, except that no filtering in situ is performed in the case of the turntable and tape 12. Proper disposition is made of the used turntable and the used portions of the tapes.

Figure 10:
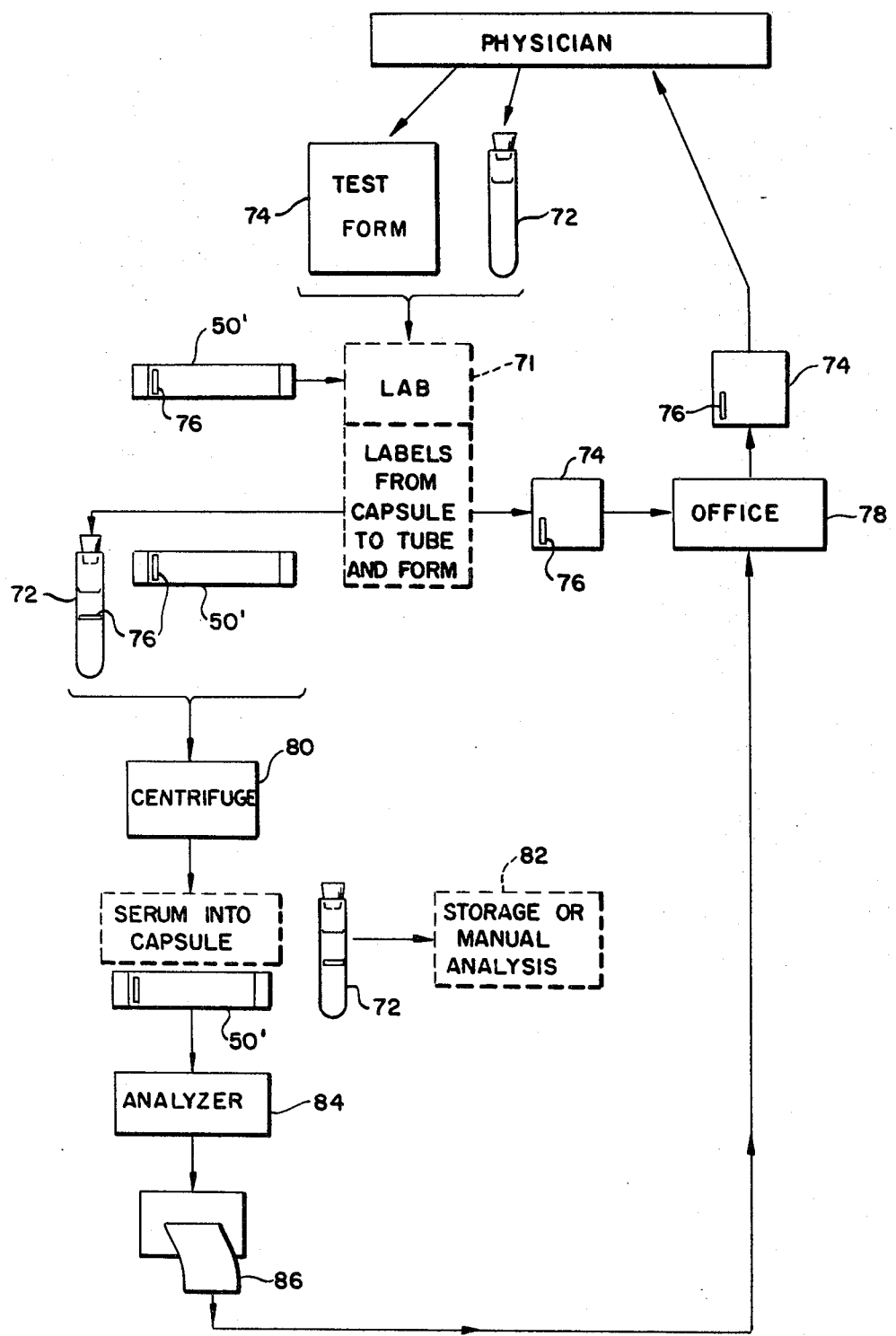
FIG. 10 is a flow diagram illustrating a procedure and means for identifying the analytical results of a sample with the patient from whom the sample was taken.

The analytical results may be correlated with the source or the patient from whom the sample was taken by use of procedures to be described. As illustrated in FIG. 10, when a sample arrives at the laboratory 71 it is usually in a glass test tube 72 with a sheet of paper or test form 74 attached stating the patient's name and other identifying data and indicating the tests to be run. Upon receipt, a unitary form of the sample holder or capsule 50′ of the present invention, having attached thereto a set of pressure-sensitive adhesive labels 76 with automatically readable printing thereon as, for example, by the use of magnetic ink, is associated with the sample and the test form, labels from the capsule bearing the same identification number being applied to the tube and the test form, after which the test form may be sent to office 78 for filing and later retrieval. The sample test tube 72 and the capsule 50′ are then sent to a centrifuge 80 and after spinning down, serum from the sample is placed in the capsule. The remainder of the sample may then be subjected to manual analysis and/or placed temporarily in storage 82 for future possible need, the capsule being sent to an analyzer 84. After analysis, the read-out with identifying number and test results is printed on a tape 86 or other form and sent to the laboratory office 78 for completion of the test form in correlation with the data on the print-out tape 86, after which the completed test form 74 is returned to the physician who requested the tests.

Figure 11:
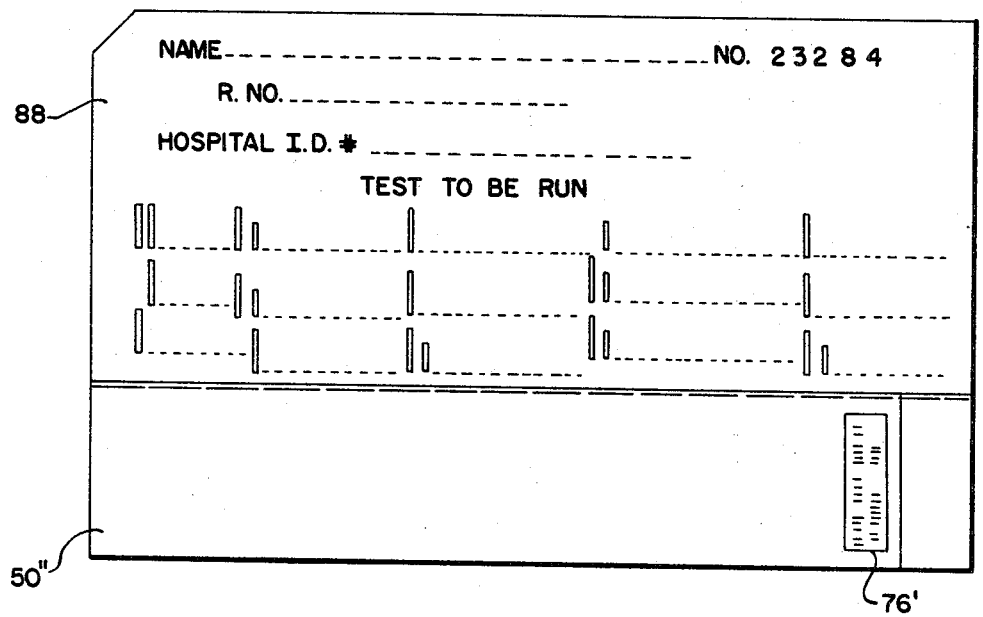
FIG. 11 illustrates a variation in the means used in the procedure illustrated in FIG. 10.

In a more sophisticated form of procedure, a capsule 50″ (shown in plane view) may be manufactured having a key punch type card 88 and a set of adhesive labels 76′ attached thereto, all with machine-readable identifying numbers, FIG. 11. A label 76′ is placed on the test form and on the test tube, the patient data and test requirements are transferred to the card 88 and the sample is spun down. A small amount of serum is placed in the first cup and now the card, test tube and sample capsule may be separated; the test tube to temporary storage in case a re-run is required, the card to a key punch machine and then to a computer, the capsule to the analyzer. In the analyzer, the capsule identification number will be read at the time the result appears and the number and result transmitted to the computer buffer memory. After all the results are in, the computer will print them on the card which will then be sent to the physician requesting the tests.

OPERATION

The manner of use and operation of the sample holders of the present invention should be apparent from the foregoing description, however, briefly and in summary, the sample holder in any of its forms is associated with an automated clinical analyzer which has conveyor or transport mechanisms for advancing the sample holder during analysis, the mechanisms being indexed to place the sample holder at the several processing stations sequentially, where automated equipment is provided for adding reagents, transferring sample material, taking readings, etc. Thus, a sample of biological fluid placed in the first cup of a row of cups is subjected in sequence to the processing steps of the analysis, the final result being printed out or otherwise indicated. In the case where the sample holder is provided with filter means, the procedure at certain processing stations is varied in that filtering is performed in situ. The application of identifying indicia to the sample tube, test form and the sample holder provides means for establishing a procedure for positively identifying the results of the analysis with the sample.

There has thus been provided sample holding means which overcome the disadvantages and problems attendant upon the use of test tubes for this purpose.

Although the present invention has been described in connection with four illustrative embodiments, it should be understood that the novelty thereof is not limited to the specific embodiments illustrated and described but is defined only by the scope of the appended claims.

What is claimed is:

1. Liquid chemical sample holding means comprising, in combination:

a body member;

a plurality of aligned cups integrally formed in said body member;

a protective cover disposed over said cups and sealed to said body member; and said body member supporting filter means between certain of said cups for filtering a liquid sample as it passes from one of said cups to the other of said cups.

2. The sample holding means of claim 1 wherein:

said filter means comprises a sheet of porous material having a pair of spaced-apart edges, one of said edges being sealed to the body member and the other of said edges being sealed to said cover.

3. The sample holding means of claim 2 wherein:

said porous material is filter paper.

4. Unitary sample holding means for individually containing and processing a fluid sample from a single source comprising, in combination:

an elongated body member;

a plurality of cups formed in said body member; and a filter means incorporated in said sample holding means and disposed between certain of said cups for filtering said sample as it passes from one of said cups to the other of said cups.

5. The sample holding means as defined in claim 4 wherein:

said cups are linearly disposed lengthwise of said body member; and said body member is supported in a U-shaped carrier and is provided with runner-like members of magnetically attractable material.

6. The sample holding means of claim 4 wherein:

said filter means comprises a sheet of porous material having side edges sealed to the sides of said body member and a transverse edge sealed to said body member adjacent to the cup to which the liquid sample passes.

7. The sample holding means of claim 6 wherein:

said porous material is filter paper.

8. The sample holding means as defined in claim 4 wherein:

said sample holding means is provided with indicia for identification of the processing results with the source of the sample.

9. The sample holding means of claim 8 wherein:

said indicia includes a key punch type card and adhesive labels with automatically readable numbers.

References Cited

UNITED STATES PATENTS

| | | |
|---|---|---|
| 3,036,894 | 5/1962 | Forestiere. |
| 3,054,679 | 9/1962 | Bradford. |
| 3,303,927 | 2/1967 | Ballard _____ 206—42 |

MORRIS O. WOLK, Primary Examiner

R. M. REESE, Assistant Examiner

U.S. Cl. X.R.

23—253; 210—323